United States Patent
Zysman et al.

(10) Patent No.: US 10,060,390 B2
(45) Date of Patent: Aug. 28, 2018

(54) BYPASS DUCT WITH ANGLED DRAG LINKS

(75) Inventors: Steven H. Zysman, Amston, CT (US); Edward F. Migliaro, Jr., Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 1928 days.

(21) Appl. No.: 13/407,805

(22) Filed: Feb. 29, 2012

(65) Prior Publication Data

US 2013/0219857 A1 Aug. 29, 2013

(51) Int. Cl.
*F02K 1/72* (2006.01)
*F02K 1/76* (2006.01)

(52) U.S. Cl.
CPC ............... *F02K 1/72* (2013.01); *F02K 1/763* (2013.01); *F05D 2250/73* (2013.01); *F05D 2260/50* (2013.01); *Y10T 29/49234* (2015.01)

(58) Field of Classification Search
CPC ..... F02K 1/68; F02K 1/70; F02K 1/72; F02K 1/763; F05D 2250/73
USPC .......... 60/226.2; 239/265.23, 265.25, 265.37
See application file for complete search history.

(56) References Cited

U.S. PATENT DOCUMENTS

| | | | |
|---|---|---|---|
| 3,287,906 A | 11/1966 | McCormick | |
| 4,564,160 A | 1/1986 | Vermilye | |
| 4,571,936 A | 2/1986 | Nash et al. | |
| 4,751,816 A * | 6/1988 | Perry | 60/226.1 |
| 4,807,434 A * | 2/1989 | Jurich | 60/226.2 |
| 5,575,147 A | 11/1996 | Nikkanen | |
| 5,915,917 A | 6/1999 | Eveker et al. | |
| 5,927,647 A | 7/1999 | Masters et al. | |
| 2008/0110154 A1 | 5/2008 | Kemper et al. | |
| 2010/0148396 A1 | 6/2010 | Xie et al. | |
| 2010/0218483 A1 | 9/2010 | Smith | |
| 2010/0270428 A1 | 10/2010 | Murphy | |
| 2010/0331139 A1 | 12/2010 | McCune | |
| 2011/0255964 A1 | 10/2011 | Clemen | |
| 2011/0268560 A1 | 11/2011 | Morvant et al. | |

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

International Preliminary Report on Patentability for Application No. PCT/US2013/026244, dated Sep. 12, 2014.

(Continued)

*Primary Examiner* — Craig Kim
*Assistant Examiner* — Stefan Ibroni
(74) *Attorney, Agent, or Firm* — Carlson, Gaskey & Olds, P.C.

(57) ABSTRACT

A gas turbine engine includes an engine core outer casing and a fan nacelle spaced radially outwardly relative to the engine core outer casing to define a bypass duct. A plurality of drag links is used to pivot blocker doors into a flow blocking position in the bypass duct when a thrust reverser is deployed. The plurality of drag links is located within the bypass duct in an area of non-uniform flow defined by a plurality of local airflow angles. Each drag link is individually configured to align with one of the local flow angles.

22 Claims, 9 Drawing Sheets

(56) References Cited

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

\* cited by examiner

BYPASS DUCT WITH ANGLED DRAG LINKS

BACKGROUND OF THE INVENTION

This disclosure relates to bypass duct for a gas turbine engine that includes drag links that are angled based on local air flow conditions.

Gas turbine engines have a core airflow that comprises a primary flow through a core engine and a fan airflow that comprises a bypass airflow between an outer surface of the core engine and an inner surface of a nacelle cowling. Air flows into the fan inlet and is split into the primary and bypass airflows by a splitter. The primary flow passes through low and high pressure compressors and generates the pressure required for efficient combustion. The air is then expanded through high and low turbine modules, which extract energy used to power the compressors and fan. The primary air flow leaves the engine through a primary exhaust nozzle and the bypass air flow is discharged through a secondary nozzle. The primary air flow provides approximately 10% of the total forward thrust while the bypass airflow supplies approximately 90% of the total forward thrust. When a thrust reverser is deployed, the secondary nozzle is blocked and bypass air is directed outward in a forward direction and through reverser cascades to provide reverse thrust.

As most of the airflow passes through the bypass duct between the nacelle cowling and engine core, the thrust specific fuel consumption (TSFC) is very sensitive to pressure loss in the bypass duct. One structure that contributes to the pressure loss is thrust reverser drag links. These drag links cause blocker doors to pivot into a flow blocking position when the thrust reverser is deployed during landing. Therefore, it is desired to improve TSFC while at the same time preserving the functionality performed by the drag links of the thrust reverser.

SUMMARY OF THE INVENTION

In one exemplary embodiment, a gas turbine engine includes an engine core outer casing and a fan nacelle spaced radially outwardly relative to the engine core outer casing to define a bypass duct. A plurality of drag links is used to pivot blocker doors into a flow blocking position in the bypass duct when a thrust reverser is deployed. The plurality of drag links is located within the bypass duct in an area of non-uniform flow defined by a plurality of local airflow angles. Each drag link is individually configured to align with one of the local flow angles.

In a further embodiment of the above, the plurality of drag links includes at least a first drag link and a second drag link, the first drag link being aligned with a first local airflow angle and the second drag link being aligned with a second local airflow angle different from the first local airflow angle.

In a further embodiment of any of the above, each drag link comprises a link body having a first end pivotally connected to the engine core outer casing at a first pivot attachment and a second end pivotally attached to one of the blocker doors at a second pivot attachment.

In a further embodiment of any of the above, the drag links are circumferentially spaced about the engine core outer casing to define a plurality of drag link positions, and wherein the plurality of local air flow angles comprises a specific local airflow angle at each drag link position, and wherein each drag link at a respective drag link position is individually configured to align with the specific local airflow angle for that respective drag link position.

In a further embodiment of any of the above, the drag links are not aligned with the respective specific local airflow angle at connection points to the engine core outer casing and blocker doors.

In a further embodiment of any of the above, alignment of each drag link is determined prior to installation based on computational analysis of predicted air flow through the bypass duct.

In another exemplary embodiment, a gas turbine engine includes an engine core outer casing, and a fan nacelle spaced radially outwardly relative to the engine core outer casing to define a bypass duct. A plurality of drag links pivot blocker doors into a flow blocking position in the bypass duct when a thrust reverser is deployed. Each drag link comprises a link body having a first end pivotally connected to the engine core outer casing at a first pivot attachment and a second end pivotally attached to one of the blocker doors at a second pivot attachment. The plurality of drag links are located within the bypass duct in an area of non-uniform flow defined by a plurality of local airflow angles, and each link body is individually configured to align with one of the local flow angles.

In a further embodiment of any of the above, the drag links are circumferentially spaced about the engine core outer casing to define a plurality of drag link positions, and wherein the plurality of local air flow angles comprises a specific local airflow angle at each drag link position, and wherein each link body at a respective drag link position is individually configured to align with the specific local airflow angle for that respective drag link position.

In a further embodiment of any of the above, the first and second ends of the drag links are not aligned with the respective specific local airflow angle at the first and second pivot attachments.

In a further embodiment of any of the above, alignment of each drag link is determined prior to installation based on computational fluid dynamic analysis of predicted air flow through the bypass duct.

In a further embodiment of any of the above, a first shaft is surrounded by the engine core outer casing and defines an axis of rotation, a low pressure turbine is configured to drive the first shaft, a low pressure compressor is driven by the first shaft, and a fan is connected to the first shaft through a geared architecture to drive the fan at a lower speed than the first shaft.

In a further embodiment of any of the above, a second shaft is surrounded by the engine core outer casing and rotatable about the axis of rotation, a high pressure turbine is configured to drive the second shaft, and a high pressure compressor is driven by the second shaft.

In a further embodiment of any of the above, each drag link includes a mounting flange for connection to the first end of the respective link body. Each mounting flange comprises a base portion that is attached to the engine core outer casing and an outwardly extending mounting boss that defines the first pivot attachment.

In a further embodiment of any of the above, each mounting boss comprises a slot orientated at a first angle that receives the first end of the respective link body, and wherein the link body is oriented at a second angle that is different than the first angle.

One exemplary method of assembling a gas turbine engine comprises the steps of: (a) providing an engine core outer casing, a fan nacelle spaced radially outwardly relative to the engine core outer casing to define a bypass duct, and a plurality of drag links that cause blocker doors to pivot into a flow blocking position in the bypass duct when a thrust reverser is deployed; (b) predicting local airflow angles within the bypass duct; and (c) individually configuring each drag link to align with one of the local airflow angles when installed within the bypass duct of the gas turbine engine.

In a further embodiment of the above, step (b) is performed prior to installing the drag links in the engine.

In a further embodiment of any of the above, step (b) is performed using computational fluid dynamic analysis.

In a further embodiment of any of the above, the method includes providing each drag link with a link body having a first end pivotally connected to the engine core outer casing at a first pivot attachment and a second end pivotally attached to one of the blocker doors at a second pivot attachment, and includes the steps of circumferentially spacing the drag links about the engine core outer casing to define a plurality of drag link positions, with the plurality of local air flow angles comprising a specific local airflow angle at each drag link position, and individually configuring each link body at a respective drag link position to align with the specific local airflow angle for that respective drag link position.

In a further embodiment of any of the above, the method includes the steps of not aligning the drag links with the respective specific local airflow angle at connection points to the engine core outer casing and blocker doors.

In a further embodiment of any of the above, the method includes providing each drag link with a link body having a first end pivotally connected to the engine core outer casing at a first pivot attachment and a second end pivotally attached to one of the blocker doors at a second pivot attachment, and includes the steps of circumferentially spacing the drag links about the engine core outer casing to define a plurality of drag link positions, with the plurality of local air flow angles comprising a specific local airflow angle at each drag link position, and individually configuring each link body at a respective drag link position to align with the average airflow angle for that respective drag link position, should the local airflow angle vary along the span of the drag link.

In a further embodiment of any of the above, the method includes the steps of installing a shaft to be surrounded by the engine core outer casing, configuring a turbine to drive the shaft, configuring a compressor to be driven by the shaft, and connecting a fan to the shaft through a geared architecture to drive the fan at a lower speed than the shaft.

These and other features of this application will be best understood from the following specification and drawings, the following of which is a brief description.

DETAILED DESCRIPTION

Figure 1:
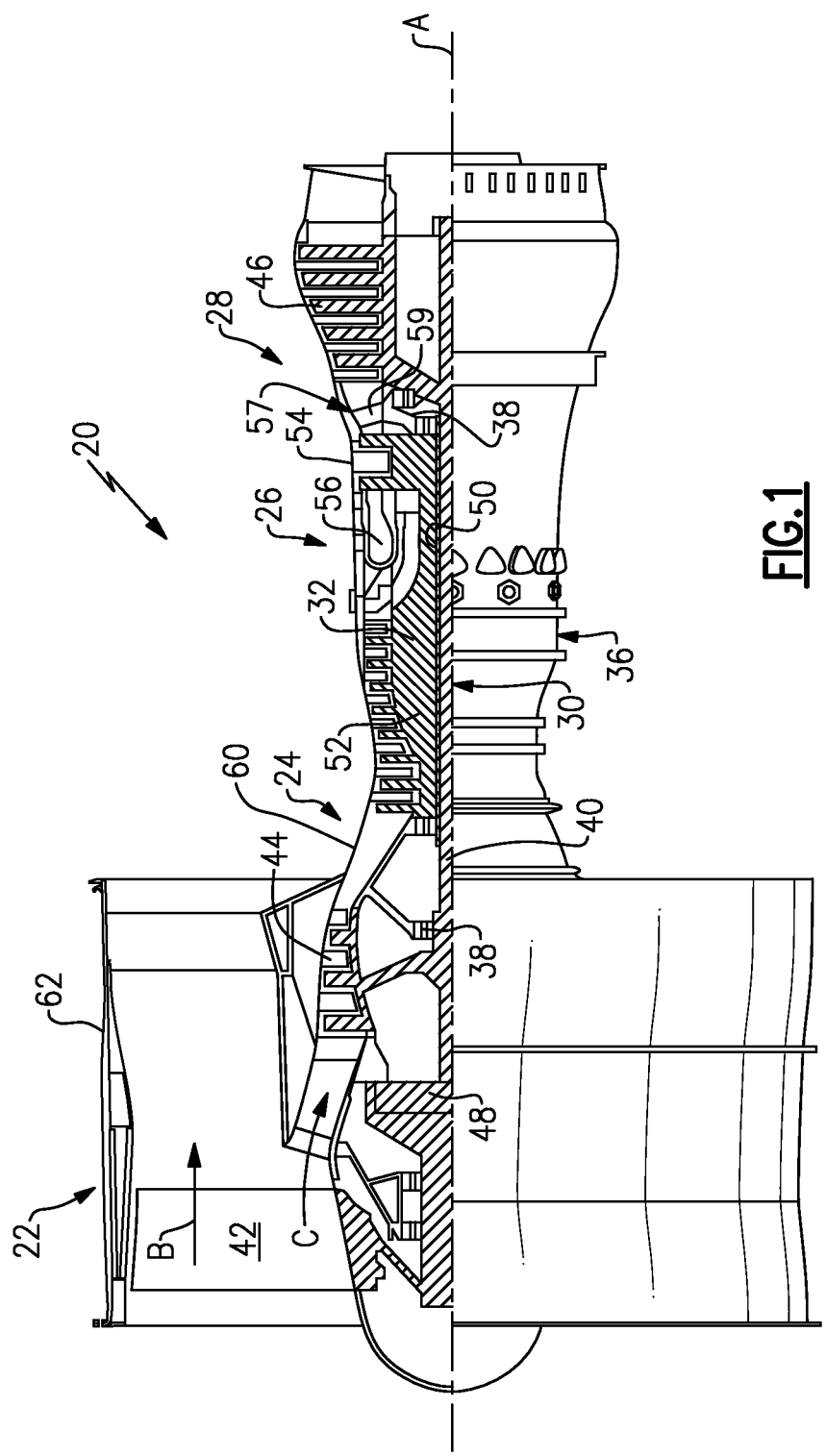
FIG. 1 schematically illustrates one example of a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

As discussed above, the gas turbine engine has a core airflow C that comprises a primary flow through the core engine and a fan airflow that comprises a bypass airflow B. Air flows into the fan inlet and is split into the primary and bypass airflows. When a thrust reverser is deployed, the bypass flow is substantially blocked from continuing to flow rearwardly, and instead is redirected outward in a forward direction to provide reverse thrust.

Figure 2:
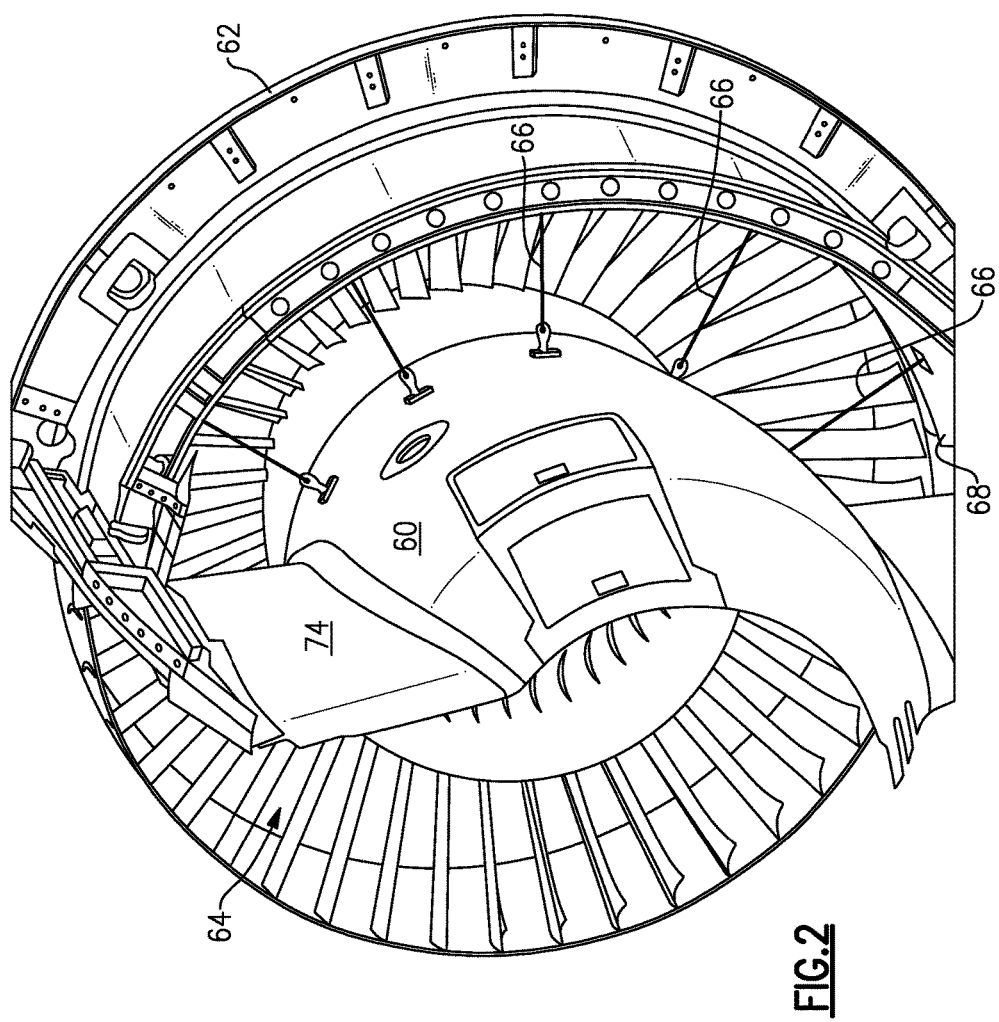
FIG. 2 is a perspective view showing an embodiment of a fan section and half of a bypass duct with a plurality of drag links and blocker doors in a non-deployed position.
Figure 10A:
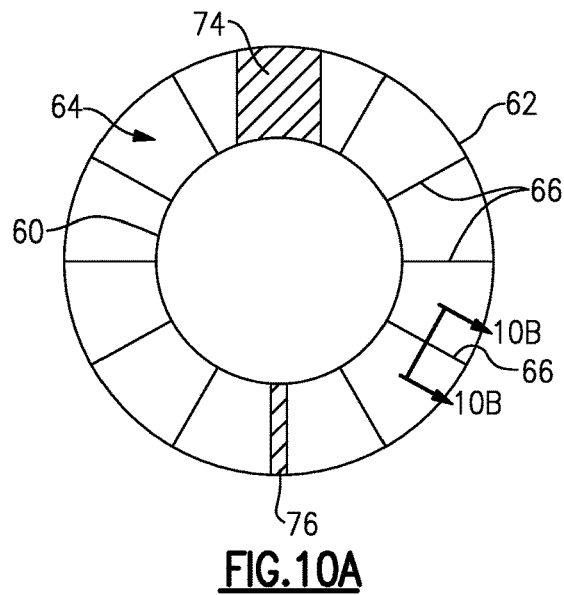
FIG. 10A is a schematic front view of the foregoing gas turbine engine embodiments.
Figure 10B:
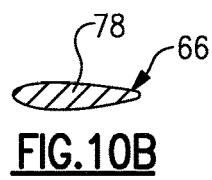
FIG. 10B shows a cross-sectional shape of a drag link body of the foregoing gas turbine engine embodiments.
Figure 10C:
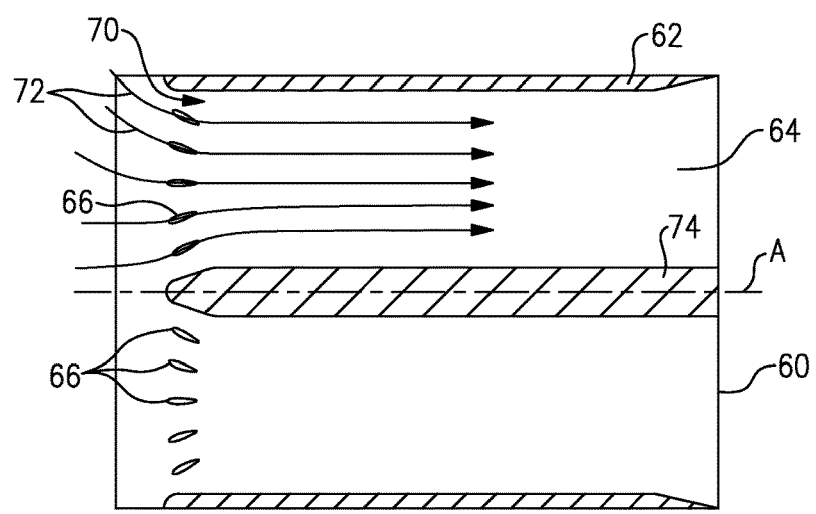
FIG. 10C is a schematic top section view of FIG. 10A in an unwrapped configuration

As shown in FIG. 2, the engine includes a core outer casing 60 and a fan nacelle 62 spaced radially outwardly relative to the engine core outer casing 60 to define a bypass duct 64. A plurality of drag links 66 pivot blocker doors 68 (FIGS. 3-4) into a flow blocking position in the bypass duct 64 when a thrust reverser is deployed. As shown in FIGS. 10A-10C, the drag links 66 are connected between the nacelle 62 and outer casing 60 and are located in an area of non-uniform flow 70 in the bypass duct 64. The area of non-uniform flow 70 is defined by a plurality of local airflow angles 72. As shown in FIG. 10C, each drag link 66 is individually configured to align with one of the local flow angles 72.

FIG. 10A shows a schematic front view of the engine with upper 74 and lower 76 bifurcators, which extend between the fan nacelle 62 and outer casing 60 to provide structural support. The drag links 66 are circumferentially spaced about the outer casing 60 to define a plurality of drag link positions. The drag links 66 are movable between a non-deployed position where the blocker doors 68 are in a non-blocking position and a deployed position where the blocker doors are in a blocking position. As shown in FIG. 10B, each drag link 66 has an airfoil shaped cross-section 78.

FIG. 10C is a schematic top section view of FIG. 10A in an unwrapped configuration, i.e. the top view is flattened out to schematically show the drag links 66 on each side of the upper bifurcator 74. The bifurcator 74 generally extends along an engine axis A. The non-uniform flow 70 entering the bypass duct 64 is defined by the plurality of local airflow angles 72. As shown, each local airflow angle is specifically, and perhaps uniquely, orientated relative to the engine axis A. Each drag link 66 is installed within the engine such that each drag link 66 will align with the local airflow at each specific drag link position.

In prior configurations, drag links were configured to all be in alignment with the engine axis A. However, fuel consumption is very sensitive to pressure loss in the bypass duct 64. This is because most of the airflow producing thrust passes through the bypass duct 64, as opposed to conventional systems that pass more flow through the engine core. When the drag links 66 are positioned in alignment with the engine centerline, they contribute to pressure loss within the duct. Flow going through the bypass duct 64 is affected by the large upper bifurcator 74, which tends to push flow downwardly away from the top of the nacelle 62.

It has been determined that the drag links 66 are located within an area of non-uniform flow 70, and as such, conventional drag links are not always in the best position to provide the most aerodynamic air flow. In the configuration shown in FIGS. 2-10, the drag links are individually tailored to their flow environment. It has been determined that local flow angles can be as much as 45 degrees at the top, and less than that at the bottom of the nacelle. Computational fluid dynamic analysis is used to predict the local flow angles. The drag links 66 are then configured such that each drag link 66 will be aligned with the local airflow angle 72 that exists at the respective drag link installation position. The drag links 66 are then installed in the engine.

Figure 3:
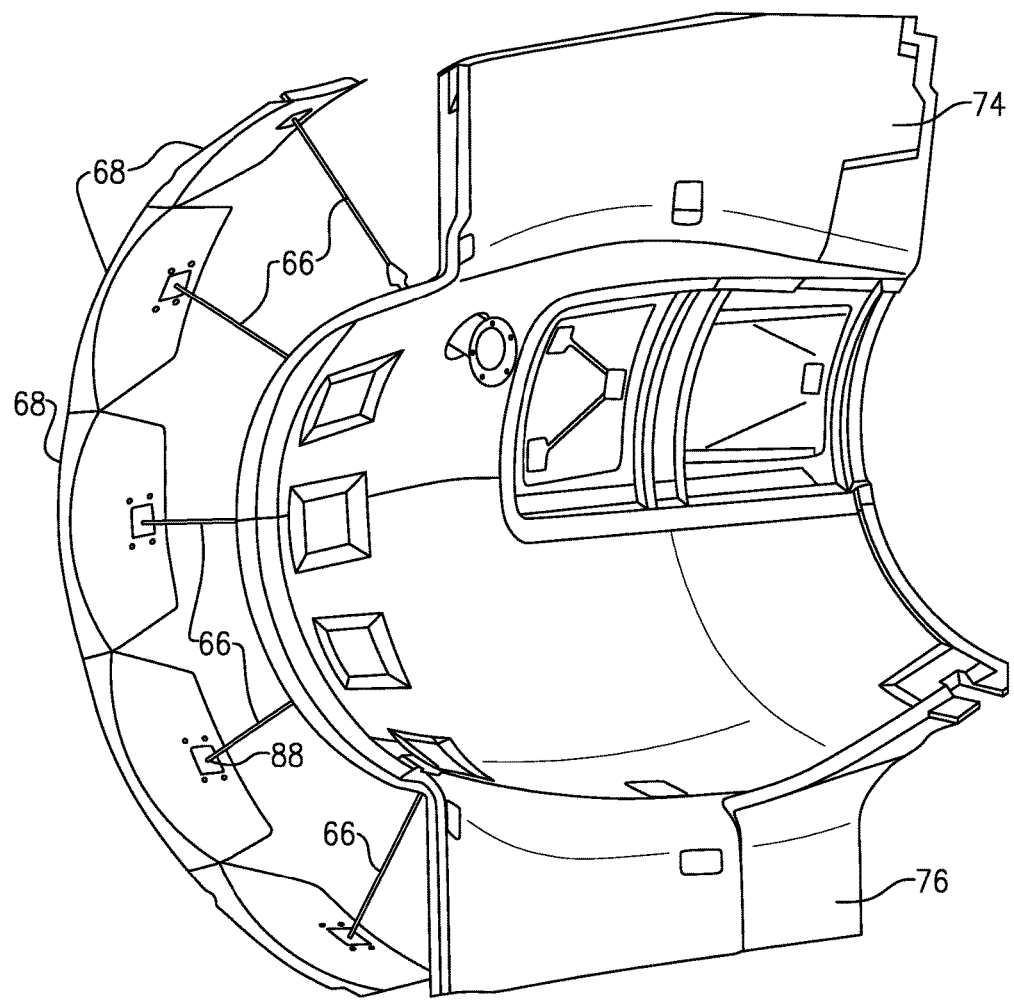
FIG. 3 is similar to FIG. 2 but the fan section has been removed.

FIG. 2 shows one half of the outer casing 60 with associated drag links 66 extending to the nacelle 62. The blocker doors 68 are in a non-deployed position. FIG. 3 is similar to FIG. 2 but the nacelle 62 has been removed such that the blocker doors 68 are more easily seen in their non-deployed position.

Figure 4:
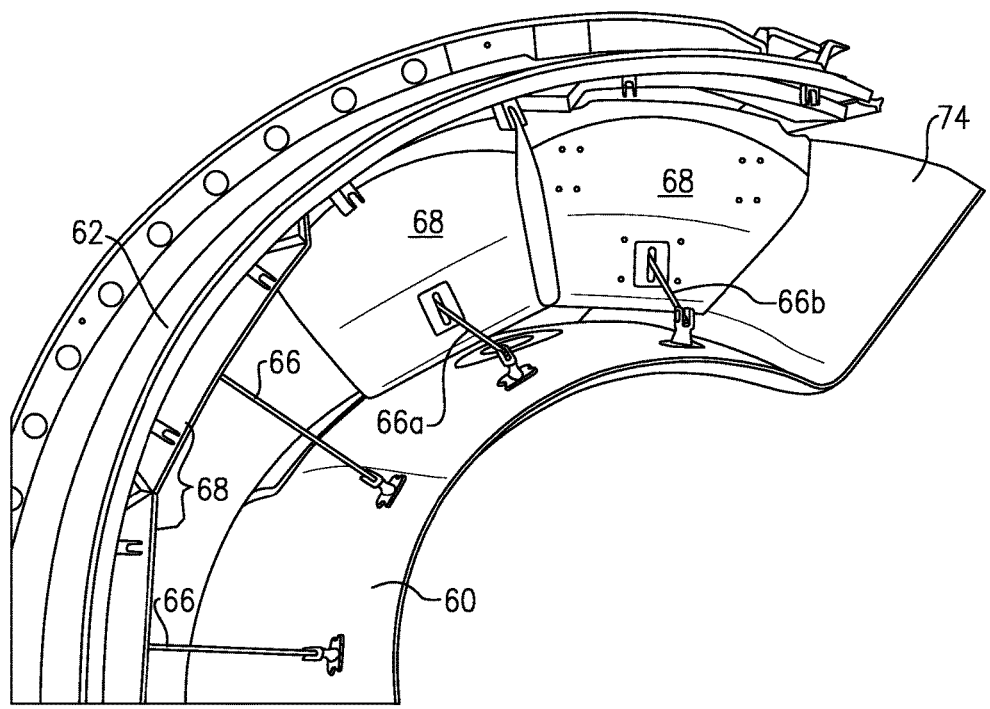
FIG. 4 is a perspective view of a portion of the fan section and engine half of FIG. 2 with two blocker doors shown in a deployed position.

FIG. 4 shows an example where two blocker doors 68 are in the deployed position, with the remaining blocker doors 68 being in a non-deployed position. This is only for purposes of clarity for comparison of the differing drag link positions. It should be understood that all blocker doors 68 would be deployed at the same time. In this example, a first drag link 66a is aligned with a first local airflow angle and a second drag link 66b is aligned with a second local airflow angle different from the first local airflow angle.

Figure 5:
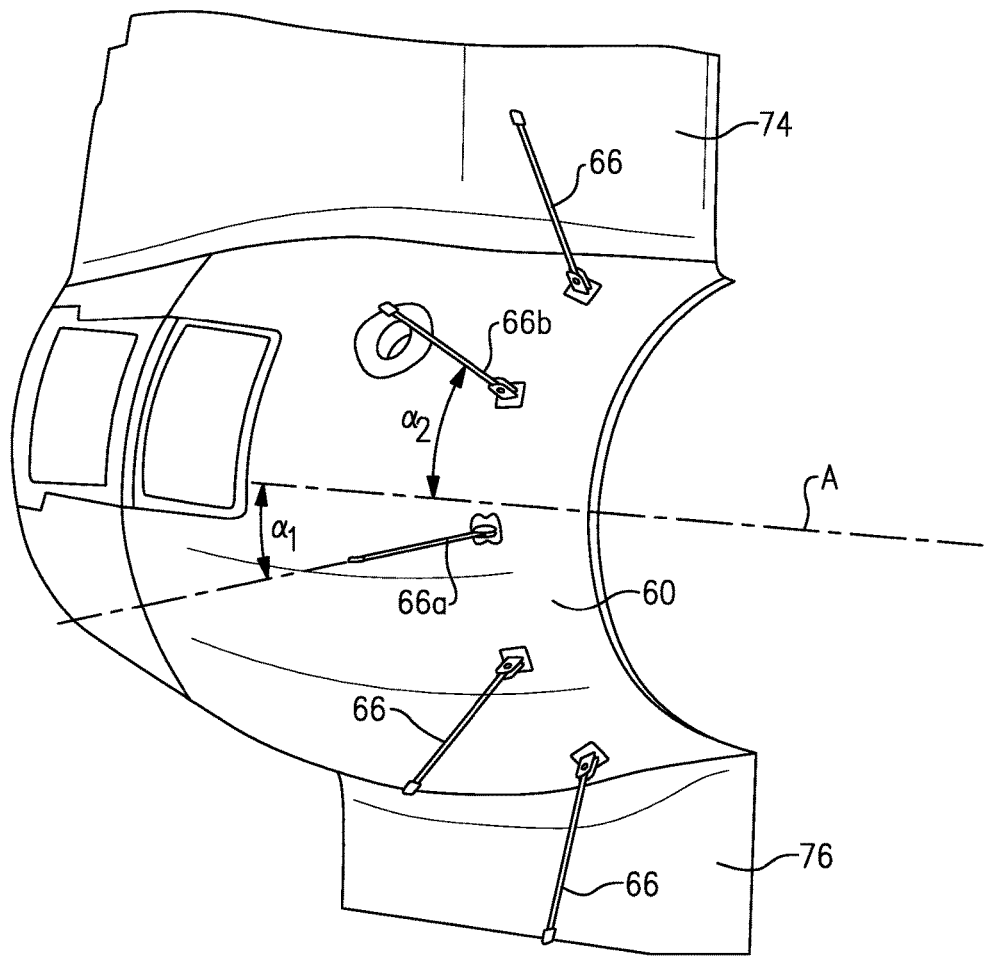
FIG. 5 is a perspective view of one engine core half of the foregoing embodiment with a plurality of drag links configured to align with local airflow angles.
Figure 6:
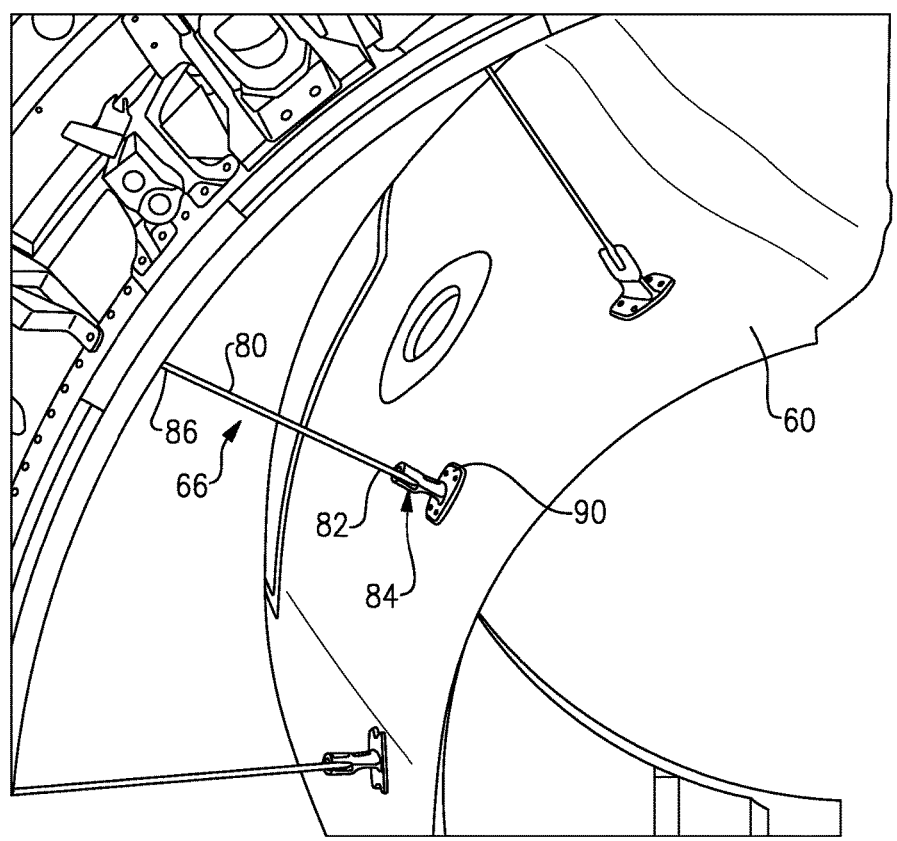
FIG. 6 is perspective view showing connections of the drags links to an engine core casing and blocker door in the foregoing embodiment.

The different orientations of the various drag links 66 is shown more clearly in FIGS. 5-6, which show a plurality of drag links 66 each being orientated at a specific, and perhaps unique, angle within the flow path, i.e., relative to the engine axis A. As shown in FIG. 6, each drag link 66 comprises a link body 80 having a first end 82 pivotally connected to the engine core outer casing 60 at a first pivot attachment 84 and a second end 86 pivotally attached to one of the blocker doors 68 at a second pivot attachment 88 (FIG. 3). As shown in FIG. 4, the drag links 66 extend generally radially outwardly from the outer casing 60 to the nacelle 62 when in the non-deployed position. When the thrust reverse is deployed and the blocker doors 68 are moved to the blocking position, each link body 80 moves inwardly with its associated blocker door such that the respective body 80 extends more in the direction of airflow.

FIG. 6 shows that each drag link 66 is orientated at a specific angle within the bypass duct 64. In other words, each drag links is orientated at a different angle within the airflow as compared to the other drag links. The angles of orientation correspond to local flow angles that exist during flight. As such, each drag link position in the engine has a drag link that is installed at a corresponding specific flow angle to provide the most aerodynamic flow through the bypass duct 64.

Figure 7:
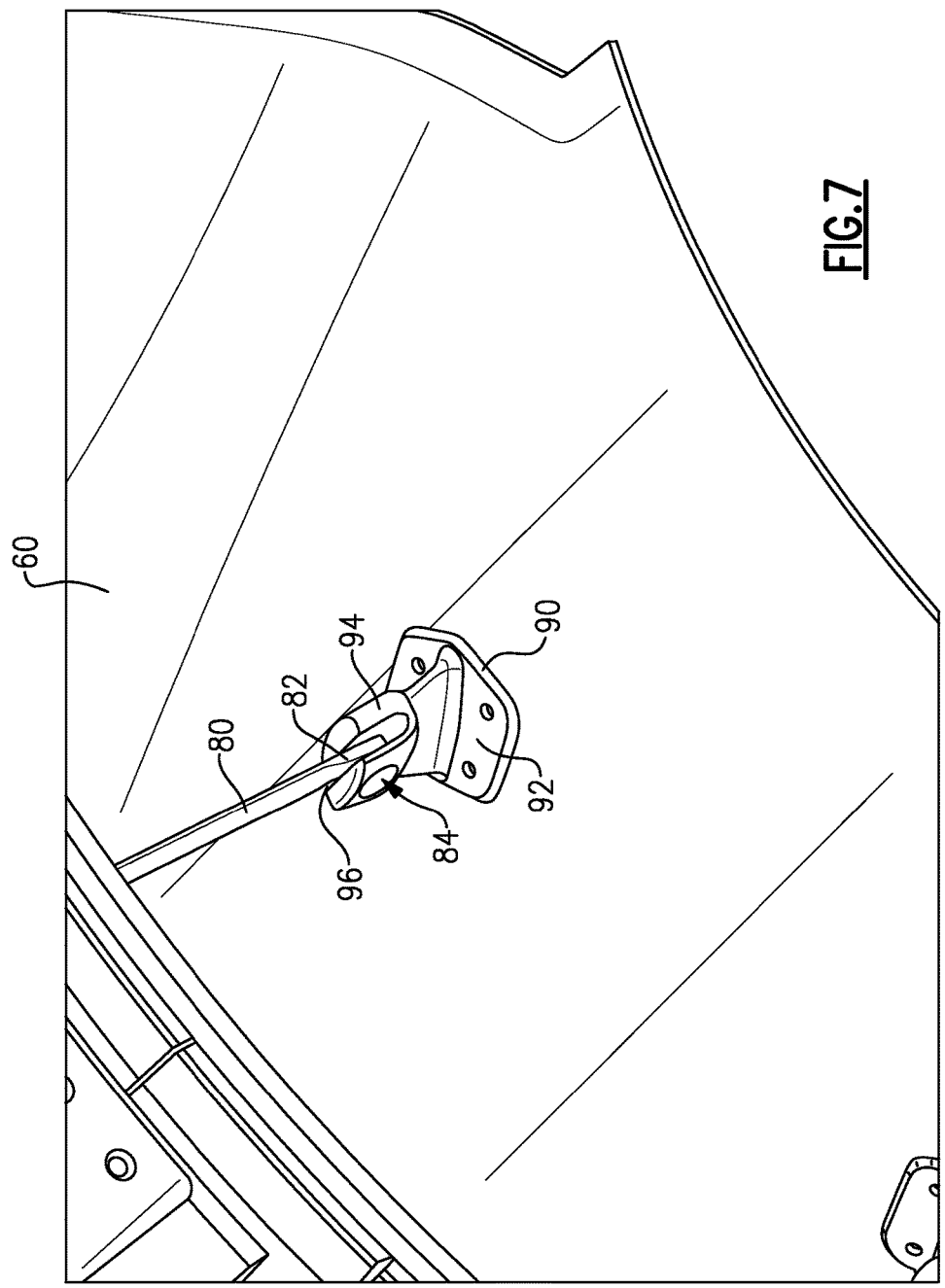
FIG. 7 is an enlarged perspective side view showing a mounting configuration for the drag link to the engine core casing in the foregoing embodiment.
Figure 8:
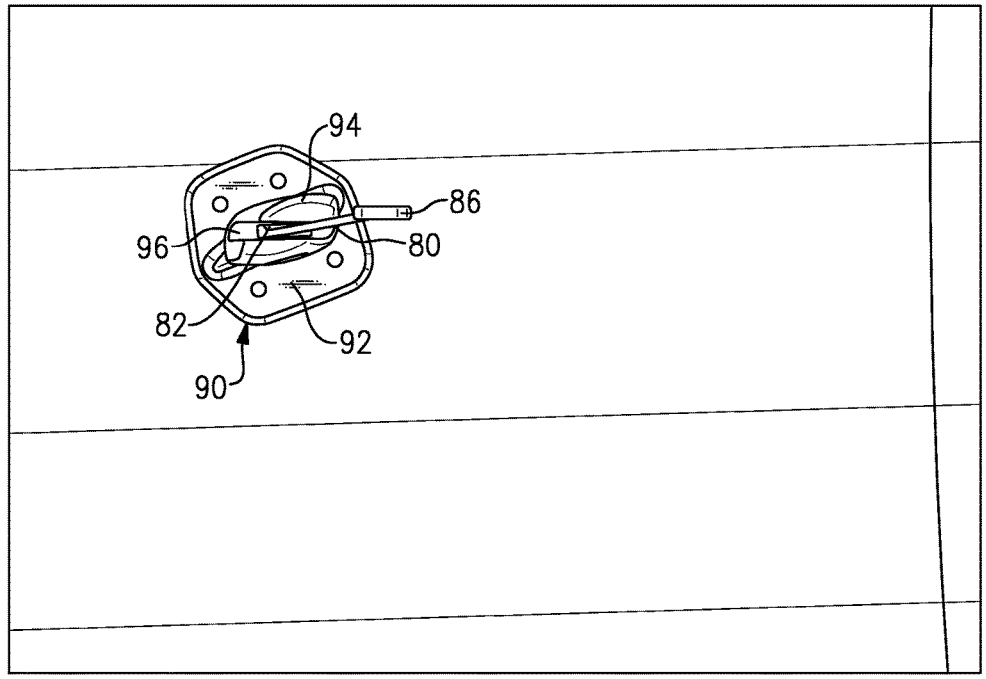
FIG. 8 is a top view of the mounting configuration of FIG. 7.
Figure 9:
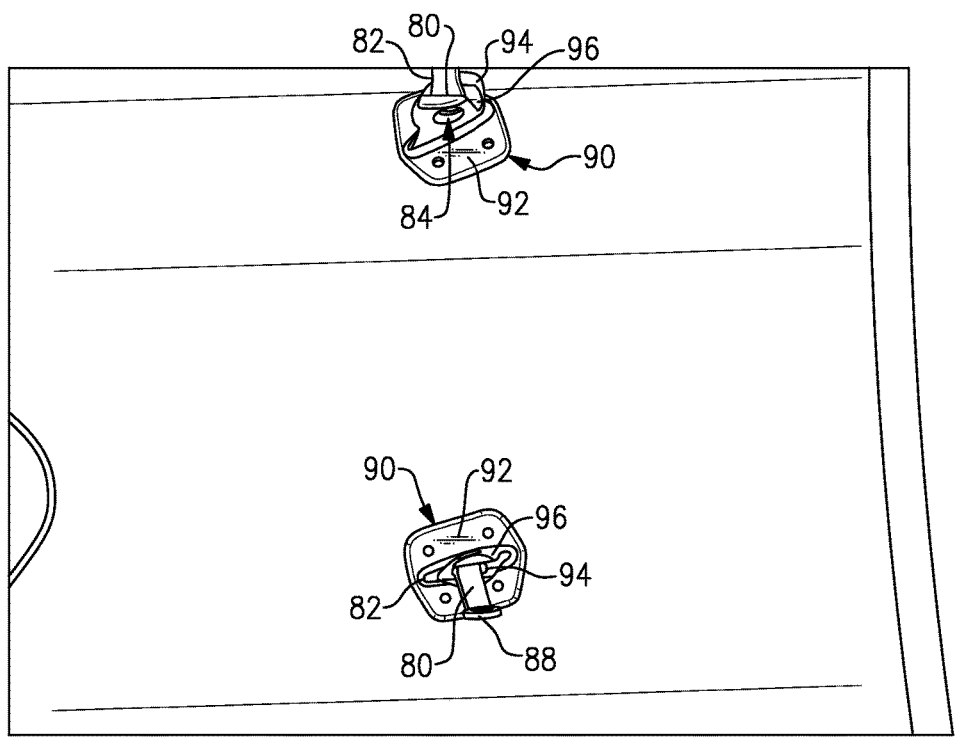
FIG. 9 is a top view of a mounting configuration of FIG. 7 for two drag links.

However, at the first 84 and second 88 pivot attachments, the link is not aligned so that the mechanical functionality is not compromised. This is best shown in FIGS. 7-9. The first end 82 of each drag link 66 is connected to a mounting flange 90. The mounting flange 90 comprises a base portion 92 that is attached to the engine core outer casing 60 and an outwardly extending mounting boss 94 that defines the first pivot attachment 84. The mounting boss 94 includes a slot 96 orientated at an angle. The first end 82 of the link body 80 is received within the slot 96. The link body 80 is oriented at different angle than the angle of slot 96. The body 80 is aligned with the local flow angle as described above. See FIGS. 8-9 which show the orientation differences between the slots 96 and the drag links 66.

A method of assembling a gas turbine engine comprises the steps of predicting local airflow angles within the bypass duct 64 and individually configuring each drag link 66 to align with one of the local airflow angles 72 when installed within the bypass duct 64. The predicting step is performed prior to installing the drag links 66 in the engine. The predicting step is performed using computational fluid dynamic analysis to identify the local airflow angles for a specific engine configuration.

Additional steps include circumferentially spacing the drag links 66 about the engine core outer casing 60 to define a plurality of drag link positions, with the plurality of local air flow angles 72 comprising a specific local airflow angle at each drag link position, and individually configuring each link body 80 at a respective drag link position to align with the specific local airflow angle 72 for that respective drag link position. The ends of the drag links 66 are not aligned with the respective specific local airflow angle at pivot attachments 84, 88 to the engine core outer casing 60 and blocker doors 68.

In another example, additional steps include circumferentially spacing the drag links about the engine core outer casing to define a plurality of drag link positions, with the plurality of local air flow angles comprising a specific local airflow angle at each drag link position, and individually configuring each link body at a respective drag link position to align with the average airflow angle for that respective drag link position, should the local airflow angle vary along the span of the drag link.

As a result of the foregoing improved orientation of the drag links relative to the airflow, the performance of the thrust reverser is improved, which directly results in improved TSFC.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   an engine core outer casing;
   a fan nacelle spaced radially outwardly relative to the engine core outer casing to define a bypass duct; and
   a plurality of drag links that cause blocker doors to pivot into a flow blocking position in the bypass duct when a thrust reverser is deployed, and wherein the plurality of drag links are located within the bypass duct in an area of non-uniform flow defined by a plurality of local airflow angles, and wherein each drag link is individually configured to align with one of the local flow angles.

2. The gas turbine engine according to claim 1, wherein the plurality of drag links includes at least a first drag link and a second drag link, the first drag link being aligned with a first local airflow angle and the second drag link being aligned with a second local airflow angle different from the first local airflow angle.

3. The gas turbine engine according to claim 1, wherein each drag link comprises a link body having a first end pivotally connected to the engine core outer casing at a first pivot attachment and a second end pivotally attached to one of the blocker doors at a second pivot attachment.

4. The gas turbine engine according to claim 1, wherein the drag links are circumferentially spaced about the engine core outer casing to define a plurality of drag link positions, and wherein the plurality of local air flow angles comprises a specific local airflow angle at each drag link position, and wherein each drag link at a respective drag link position is individually configured to align with the specific local airflow angle for that respective drag link position.

5. The gas turbine engine according to claim 4 wherein the drag links are not aligned with the respective specific local airflow angle at connection points to the engine core outer casing and blocker doors.

6. The gas turbine engine according to claim 1, wherein alignment of each drag link is determined prior to installation based on computational analysis of predicted air flow through the bypass duct.

7. A gas turbine engine comprising:
   an engine core outer casing;
   a fan nacelle spaced radially outwardly relative to the engine core outer casing to define a bypass duct;
   a plurality of drag links that cause blocker doors to pivot into a flow blocking position in the bypass duct when a thrust reverser is deployed, and wherein each drag link comprises a link body having a first end pivotally connected to the engine core outer casing at a first pivot attachment and a second end pivotally attached to one of the blocker doors at a second pivot attachment; and
   wherein the plurality of drag links are located within the bypass duct in an area of non-uniform flow defined by a plurality of local airflow angles, and wherein each link body is individually configured to align with one of the local flow angles.

8. The gas turbine engine according to claim 7, wherein the drag links are circumferentially spaced about the engine core outer casing to define a plurality of drag link positions, and wherein the plurality of local air flow angles comprises a specific local airflow angle at each drag link position, and wherein each link body at a respective drag link position is individually configured to align with the specific local airflow angle for that respective drag link position.

9. The gas turbine engine according to claim 8, wherein the first and second ends of the drag links are not aligned with the respective specific local airflow angle at the first and second pivot attachments.

10. The gas turbine engine according to claim 8, wherein alignment of each drag link is determined prior to installation based on computational fluid dynamic analysis of predicted air flow through the bypass duct.

11. The gas turbine engine according to claim 10, including a first shaft surrounded by the engine core outer casing and defining an axis of rotation, a low pressure turbine configured to drive the first shaft, a low pressure compressor driven by the first shaft, and a fan connected to the first shaft through a geared architecture to drive the fan at a lower speed than the first shaft.

12. The gas turbine engine according to claim 11, including a second shaft surrounded by the engine core outer casing and rotatable about the axis of rotation, a high pressure turbine configured to drive the second shaft, and a high pressure compressor driven by the second shaft.

13. The gas turbine engine according to claim 8, wherein each drag link comprises a mounting flange for connection to the first end of the respective link body, and wherein each mounting flange comprises a base portion that is attached to the engine core outer casing and an outwardly extending mounting boss that defines the first pivot attachment.

14. The gas turbine engine according to claim 13, wherein each mounting boss comprises a slot orientated at a first angle that receives the first end of the respective link body, and wherein the link body is oriented at a second angle that is different than the first angle.

15. The gas turbine engine according to claim 1, wherein the bypass duct defines a primary bypass flowpath direction, and wherein the local airflow angles vary from each other relative to the primary bypass flowpath direction, and wherein at least one drag link is orientated to align with a local airflow flowpath that is defined by one of the local airflow angles that is not aligned with the primary bypass flowpath direction.

16. The gas turbine engine according to claim 15, wherein at least one other drag link is orientated to align with another local airflow flowpath that is defined by another of the local airflow angles that is aligned with the primary bypass flowpath direction.

17. The gas turbine engine according to claim 1, wherein the engine core outer casing defines an engine center axis and with at least some of the local airflow angles being orientated to be non-parallel with the engine center axis, and wherein at least one drag link is orientated to align with a local airflow angle that is non-parallel with the engine center axis.

18. The gas turbine engine according to claim 3, wherein the first end of the link body is connected to a mounting flange comprising a base portion that is attached to the engine core outer casing and an outwardly extending mounting boss that defines the first pivot attachment, and wherein the mounting boss includes a slot orientated at a slot angle, and wherein the first end of the link body is received within the slot such that the link body is oriented at different angle than the slot angle.

19. The gas turbine engine according to claim 18, wherein the link body is aligned with one of the local flow angles.

20. The gas turbine engine according to claim 7, wherein the bypass duct defines a primary bypass flowpath direction, and wherein the local airflow angles vary from each other relative to the primary bypass flowpath direction, and wherein at least one drag link is orientated to align with a local airflow flowpath that is defined by one of the local airflow angles that is not aligned with the primary bypass flowpath direction, and wherein at least one other drag link is orientated to align with another local airflow flowpath that is defined by another of the local airflow angles that is aligned with the primary bypass flowpath direction.

21. The gas turbine engine according to claim 7, wherein the engine core outer casing defines an engine center axis and with at least some of the local airflow angles being orientated to be non-parallel with the engine center axis, and wherein at least one drag link is orientated to align with a local airflow angle that is non-parallel with the engine center axis.

22. The gas turbine engine according to claim 7, wherein the first end of the link body is connected to a mounting flange comprising a base portion that is attached to the engine core outer casing and an outwardly extending mounting boss that defines the first pivot attachment, and wherein the mounting boss includes a slot orientated at a slot angle, and wherein the first end of the link body is received within the slot such that the link body is oriented at different angle than the slot angle, and wherein the link body is aligned with one of the local flow angles.

* * * * *